(12) United States Patent
Hattori et al.

(10) Patent No.: US 8,094,226 B2
(45) Date of Patent: Jan. 10, 2012

(54) SOLID-STATE IMAGE CAPTURING APPARATUS AND ELECTRONIC INFORMATION EQUIPMENT

(75) Inventors: Shinji Hattori, Osaka (JP); Kiyoshige Tsuji, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 463 days.

(21) Appl. No.: 12/417,396

(22) Filed: Apr. 2, 2009

(65) Prior Publication Data

US 2009/0251576 A1 Oct. 8, 2009

(30) Foreign Application Priority Data

Apr. 3, 2008 (JP) ................................ 2008-097617

(51) Int. Cl.
*H04N 5/235* (2006.01)
*H04N 5/225* (2006.01)
*H04N 3/14* (2006.01)

(52) U.S. Cl. ..................... 348/308; 348/372; 348/294

(58) Field of Classification Search .................. 348/257, 348/294, 300, 301, 308, 372
See application file for complete search history.

(56) References Cited

U.S. PATENT DOCUMENTS 6,437,635 B1 * 8/2002 Watanabe ...................... 327/514
6,784,934 B1 * 8/2004 Watanabe ...................... 348/308

FOREIGN PATENT DOCUMENTS
JP  2006-019971  1/2006

* cited by examiner

*Primary Examiner* — David N Spector
(74) *Attorney, Agent, or Firm* — David G. Conlin; Steven M. Jensen; Edwards Wildman Palmer LLP (57) ABSTRACT

A solid-state image capturing apparatus according to the present invention includes: a pixel array in which a plurality of pixels are arranged; a driving circuit for driving each pixel of the pixel array; and a power supply circuit for stepping down an external source voltage supplied from an external power source to generate a pixel source voltage to be supplied to each pixel of the pixel array, where the power supply circuit includes a driver transistor for generating a pixel source voltage from the external source voltage and the driver transistor is operative in a saturated state.

17 Claims, 9 Drawing Sheets

SOLID-STATE IMAGE CAPTURING APPARATUS AND ELECTRONIC INFORMATION EQUIPMENT

This nonprovisional application claims priority under 35 U.S.C. §119(a) to Patent Application No. 2008-097617 filed in Japan on Apr. 3, 2008, the entire contents of which are hereby incorporated by reference.

BACKGROUND OF THE INVENTION

1. Field of the Invention

The present invention relates to a solid-state image capturing apparatus and an electronic information equipment, and in particular, to a solid-state image capturing apparatus equipped with a pixel power regulator and an electronic information equipment using such a solid-state image capturing apparatus.

2. Description of the Related Art

In conventional solid-state image capturing apparatuses, an external source voltage VANA, which is supplied from the outside of the chips that constitute the solid-state image capturing apparatus, is generally used as voltage to be supplied to pixels.

Figure 6:
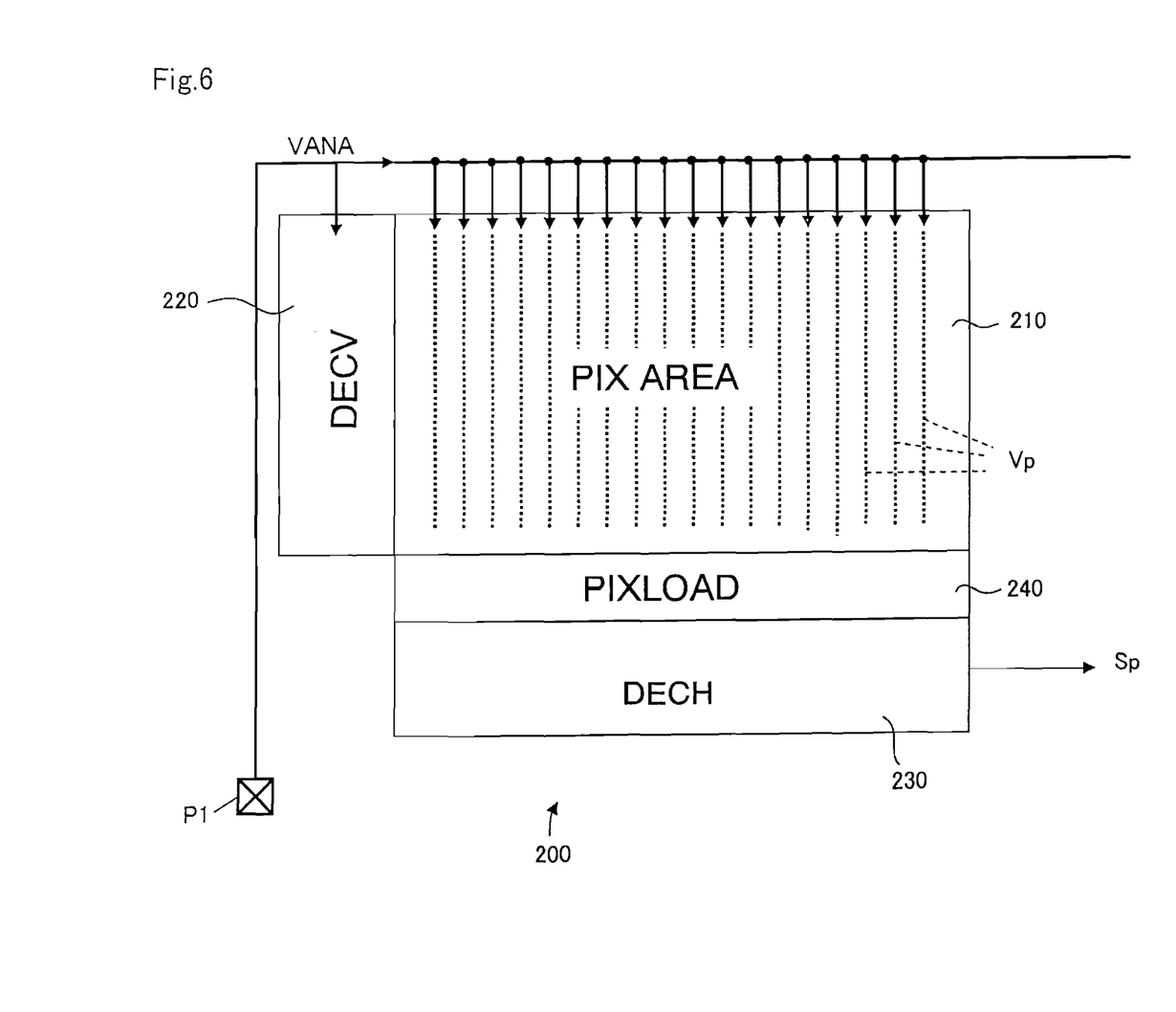
FIG. 6 is a block diagram illustrating a conventional solid-state image capturing apparatus, showing a configuration for supplying an external source voltage to pixels and a vertical driving circuit.

FIG. 6 is a block diagram illustrating a conventional solid-state image capturing apparatus, showing a configuration for supplying an external source voltage to pixels and a vertical driving circuit.

A solid-state image capturing apparatus 200 includes a pixel array (PIX AREA) 210 where pixels are arranged in a matrix; a vertical signal line (output signal line) Vp provided to correspond to each pixel column of the pixel array for reading out a voltage signal from each pixel of a corresponding pixel column; a vertical scanning circuit (DECV) 220 for selecting a specific pixel row in the pixel array to drive the pixels of the selected pixel row; a horizontal scanning circuit (DECH) 230 for processing a voltage signal read out from each pixel of the selected pixel row to the corresponding vertical signal line Vp, to be output as a pixel signal Sp; and a load (PIXLOAD) 240 connected to the vertical signal line so as to flow a constant current to each vertical signal line Vp. Herein, a pad P1 is a power source pad to which the external source voltage VANA is applied.

Figure 7:
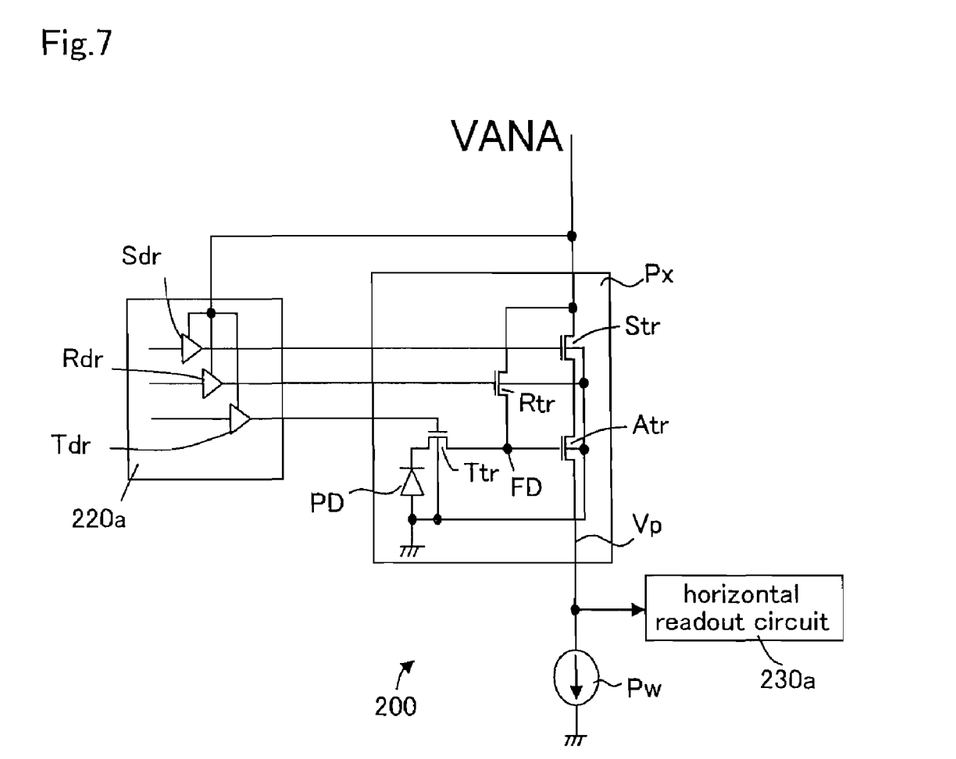
FIG. 7 is a diagram illustrating a circuit configuration of one pixel in a pixel array and a vertical driving circuit connected to one pixel in a vertical scanning circuit.

FIG. 7 is a diagram illustrating a circuit configuration of one pixel in the pixel array described above and a vertical driving circuit connected to one pixel in a vertical scanning circuit.

A pixel Px includes: a photoelectric conversion element (photodiode) PD for performing a photoelectric conversion to generate a signal charge; an electric charge accumulating section (floating diffusion) FD for accumulating the signal charge generated at the photodiode PD; a transfer transistor Ttr connected between the photodiode PD and the electric charge accumulating section FD for transferring the signal charge generated at the photodiode to the electric charge accumulating section FD; a reset transistor Rtr for resetting the signal charge accumulated in the electric charge accumulating section FD; an amplifying transistor Atr for amplifying an electric potential of the electric charge accumulating section FD to be output to the vertical signal line Vp; and a selection transistor Str connected between a drain of the amplifying transistor and the source voltage VANA for controlling the supply of the source voltage to the amplifying transistor.

In addition, a constant current source Pw is connected between the vertical signal line Vp, described above, and ground. A horizontal readout circuit 230a for reading out the voltage signal read out to the vertical signal line Vp is connected to the vertical signal line Vp that corresponds to each pixel column. This horizontal readout circuit 230a is a circuit portion that corresponds to one pixel column in the horizontal scanning circuit 230.

In addition, the pixel Px is connected to a vertical driving circuit 220a for driving the pixel, and the vertical driving circuit 220a is a circuit portion corresponding to one pixel row in the vertical scanning circuit described above. The vertical driving circuit 220a includes a driver Sdr for driving a selection signal line connected to a gate of the selection transistor Str described above; a driver Rdr for driving a reset signal line connected to a gate of the reset transistor Rtr described above; and a driver Tdr for driving a transfer signal line connected to a gate of the transfer transistor Ttr described above.

Next, the operation will be described.

When the pixel power VANA is externally applied to the power pad P1, the externally supplied pixel power VANA is supplied to the pixel array 210 and the vertical driving circuit 220a inside the vertical scanning circuit (DECV) 220.

In each pixel of the pixel array, a signal charge is generated by the photodiode PD; a signal voltage corresponding to the signal charge and a reset voltage are read out to the vertical signal line Vp by the vertical scanning circuit 220; and further, the signal voltage and the reset voltage read out to the vertical signal line Vp are processed by the horizontal scanning circuit 230 and outputted as a pixel signal Sp of each pixel.

Next, the readout operation by the vertical driving circuit will be briefly described with reference to FIG. 7.

The gate (reset signal line) of the reset transistor Rtr is driven by the driver Rdr. When the reset transistor Rtr is turned on, the electric potential of the electric charge accumulating section FD is reset by a reset voltage. Subsequently, the gate (selection signal line) of the selection transistor Str is driven by the driver Sdr. When the selection transistor Str is turned on, the source voltage VANA is applied to the drain of the amplifying transistor Atr. Consequently, the voltage of the electric charge accumulating section FD is amplified by the amplifying transistor Atr and is read out to the vertical signal line Vp as a reset voltage. In this state, when the gate (transfer signal line) of the transfer transistor Ttr is driven by the driver Tdr and thereby the transfer transistor Ttr is turned on, the signal charge generated at the photodiode PD is transferred to the electric charge accumulating section FD, and the electric potential of the electric charge accumulating section FD turns to be a signal level corresponding to the signal charge. This signal level is amplified by the amplifying transistor Atr and is output as a signal voltage.

In parallel with such an operation of outputting the electric potential level of the electric charge accumulating section FD to the vertical signal line Vp, an operation for reading out an electric potential level of the vertical signal line Vp is performed in the horizontal readout circuit 230a. That is, the horizontal readout circuit 230a reads out the rest voltage outputted to the vertical signal line Vp, and further, reads out the signal voltage outputted to the vertical signal line Vp and outputs the difference voltage as the pixel signal Sp.

In such a solid-state image capturing apparatus, however, noise from external systems is superimposed to the externally supplied source voltage. The noise is supplied to the pixel Px and even to each driver inside the vertical driving circuit 220a, namely the driver Rdr for driving the reset transistor Rtr, the driver Tdr for driving the electric charge transfer transistor Ttr, the driver Sdr for driving the pixel selection transistor Str, and the like. Consequently, deterioration in picture quality (horizontal line noise) occurs due to the noise of the pixel power.

As a method for preventing such a problem, Reference 1 discloses a CMOS image sensor equipped with a charge pump boosting circuit. Based on Reference 1, a method is easily conceivable where a voltage, which is generated by a boosting circuit with a band-gap reference voltage (BGR) and the like as a reference voltage and is not dependent on a source voltage, is used as a source voltage of a pixel and a vertical driving circuit.

Figure 8:
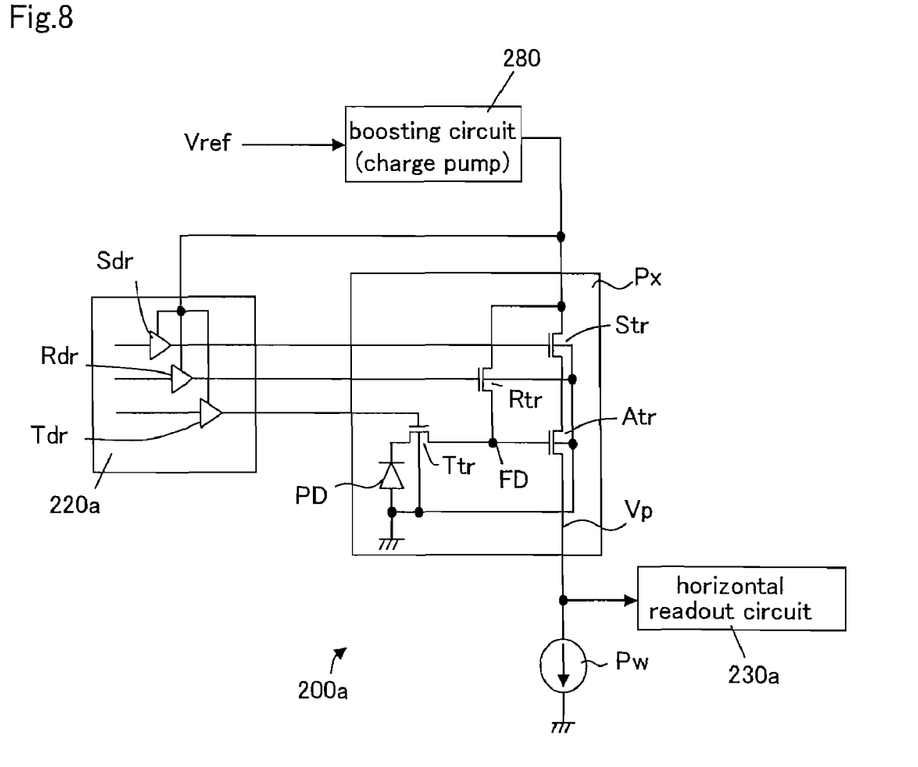
FIG. 8 is a diagram illustrating a method for avoiding power source noise using a charge pump type boosting circuit disclosed in Reference 1.

FIG. 8 is a diagram illustrating a solid-state image capturing apparatus that includes a circuit configuration that achieves such a method.

A solid-state image capturing apparatus 200a shown in FIG. 8 is the solid-state image capturing apparatus 200 shown in FIG. 7 equipped with a boosting circuit (charge pump) 280, and other configurations thereof are identical to the solid-state image capturing apparatus 200 shown in FIG. 7.

The boosting circuit 280 is provided with source voltage from an external power source. In the boosting circuit 280, a voltage that does not depend on an external source voltage is generated as a source voltage for a pixel and a vertical driving circuit, based on a reference voltage Vref generated by using band gaps of the transistors.

In this case, the influence of the noise superimposed from the external systems to the power source can be eliminated. However, as the current required for driving the pixel is supplied from the boosting circuit (charge pump) 280, the boosting circuit is required with a capability for supplying a large amount of current. That results in the increase of the layout area of the boosting circuit (charge pump) 280, and further, the increase of the power consumption by the boosting circuit (charge pump) 280.

Reference 1: Japanese Laid-Open Publication No. 2006-19971

SUMMARY OF THE INVENTION

As described above, when the source voltage, supplied from the outside of the chip, is directly inputted into the pixel and the vertical driving circuit, horizontal line noise occurs due to the influence of the noise superimposed from the source voltage. Further, when a boosting circuit is used for the pixel and the power source of the vertical driving circuit in order to prevent this problem, other significant problems, such as the increase of the chip area and the increase of the current consumption, occur.

The present invention is intended to solve the conventional problems described above. The objective of the present invention is to provide a solid-state image capturing apparatus that is capable of supplying a stable source voltage to the pixels and vertical driving circuit without a boosting circuit that causes an increase in the layout area and the current consumption, and an electronic information equipment that includes such a solid-state image capturing apparatus.

A solid-state image capturing apparatus according to the present invention includes: a pixel array in which a plurality of pixels are arranged; a driving circuit for driving each pixel of the pixel array; and a power supply circuit for stepping down an external source voltage supplied from an external power source to generate a pixel source voltage to be supplied to each pixel of the pixel array, wherein the power supply circuit includes a driver transistor for generating a pixel source voltage from the external source voltage and the driver transistor is operative in a saturated state, thereby achieving the objective described above.

Preferably, a solid-state image capturing apparatus according to the present invention further includes a bias level generating circuit for creating a constant bias level that does not depend on the external source voltage based on a reference signal, wherein the bias level is used as a control voltage of a driver transistor that constitutes the power supply circuit.

Still preferably, in a solid-state image capturing apparatus according to the present invention, wherein the bias level generating circuit controls a gate voltage of the driver transistor such that the pixel source voltage supplied from the power supply circuit becomes constant regardless of a threshold value of the driver transistor.

Still preferably, in a solid-state image capturing apparatus according to the present invention, the bias level generating circuit includes a replica transistor that has a same characteristic as the driver transistor that constitutes the power supply circuit, a resistor tap circuit inserted between a source of the replica transistor and a ground, and a differential amplifying circuit that takes as an input a reference voltage and a resistor tap voltage obtained at the resistor tap circuit, and wherein an output of the differential amplifying circuit is connected to a gate of the driver transistor that configures the power supply circuit and a gate of the replica transistor.

Still preferably, in a solid-state image capturing apparatus according to the present invention, the power supply circuit includes a plurality of driver transistors positioned along one edge of the pixel array, as the driver transistor.

Still preferably, in a solid-state image capturing apparatus according to the present invention, the driver transistor that constitutes the power supply circuit is an NMOS transistor and a back gate of the driver transistor is commonly connected to a source.

Still preferably, in a solid-state image capturing apparatus according to the present invention, the plurality of driver transistors are depletion NMOS transistors.

Still preferably, in a solid-state image capturing apparatus according to the present invention, the power supply circuit includes a single transistor as the driver transistor.

Still preferably, in a solid-state image capturing apparatus according to the present invention, the single driver transistor is a depletion NMOS transistor.

Still preferably, a solid-state image capturing apparatus according to the present invention further includes an output signal line provided for each pixel column in the pixel array for outputting a signal level obtained in pixels of the pixel column, wherein the pixel includes: a photoelectric conversion section for generating a signal charge in accordance with a light receiving amount by a photoelectric conversion of an incident light; an electric charge accumulating section for accumulating the signal charge; a transfer transistor for transferring the signal charge from the photoelectric conversion section to the electric charge accumulating section; a reset transistor for resetting the signal charge accumulated in the electric charge accumulating section; an amplifying transistor supplied with the pixel source voltage for amplifying a signal level of the electric charge accumulating section to be output; and a selection transistor connected between the amplifying transistor and the output signal line and controlled by the selection signal line to output the signal level amplified by the amplifying transistor to the output signal line.

Still preferably, a solid-state image capturing apparatus according to the present invention further includes a negative voltage generating circuit for generating a negative voltage based on a reference signal, wherein each transistor and a photodiode that constitute the pixel are formed in a P-well area formed on a semiconductor substrate, and the negative voltage generating circuit supplies the negative voltage to the P-well area, including an anode area of the photodiode, so that stepped down voltage, which is generated in the power supply circuit that is a difference from an external source voltage of the pixel source voltage, is compensated.

Still preferably, in a solid-state image capturing apparatus according to the present invention, the selection transistor and the reset transistor are depletion NMOS transistors.

Still preferably, a solid-state image capturing apparatus according to the present invention further includes an output signal line provided for each pixel column in the pixel array for outputting a signal level obtained in pixels of the pixel column, wherein the pixel includes: a photoelectric conversion section for generating a signal charge in accordance with a light receiving amount by a photoelectric conversion of an incident light; an electric charge accumulating section for accumulating the signal charge; a transfer transistor for transferring the signal charge from the photoelectric conversion section to the electric charge accumulating section; a reset transistor for resetting the signal charge accumulated in the electric charge accumulating section; and an amplifying transistor to which the pixel source voltage is supplied for amplifying a signal level of the electric charge accumulating section to be output to the vertical signal line.

Still preferably, a solid-state image capturing apparatus according to the present invention further includes a negative voltage generating circuit for generating a negative voltage based on a reference signal, wherein each transistor and a photodiode that constitute the pixel are formed in a P-well area formed on a semiconductor substrate, and the negative voltage generating circuit supplies the negative voltage to the P-well area, including an anode area of the photodiode, so that stepped down voltage, which is generated in the power supply circuit that is a difference from an external source voltage of the pixel source voltage, is compensated.

Still preferably, in a solid-state image capturing apparatus according to the present invention, the reset transistor is a depletion NMOS transistor.

Still preferably, in a solid-state image capturing apparatus according to the present invention, the driving circuit includes a vertical scanning circuit that selects a specific pixel row in the pixel array and drives pixels in the selected pixel row, and the power supply circuit supplies the pixel source voltage to the vertical driving circuit.

An electronic information equipment according to the present invention includes an image capturing section for capturing an image of a subject, wherein the image capturing section is the solid-state image capturing apparatus according to the present invention, thereby achieving the objective described above.

The functions of the present invention will be described hereinafter.

According to the present invention, a power supply circuit for stepping down an external source voltage to generate a pixel source voltage to be supplied to each pixel in a pixel array is provided; and the power supply circuit is configured to include a driver transistor for generating the pixel source voltage from the external source voltage, the driver transistor being operative in a saturated state. As a result, even when noise is superimposed on the external source voltage, the influence of the noise to the output side of the driver transistor can be prevented.

Further, according to the present invention, a bias level generating circuit for creating a constant bias level based on a reference signal is provided; and the bias level is used as a control voltage of a driver transistor that constitutes the power supply circuit. Consequently, the pixel source voltage supplied from the power supply circuit to the pixel can be maintained constant.

Further, according to the present invention, the bias level generating circuit in the solid-state image capturing apparatus includes a replica transistor that has the same characteristic as the driver transistor that constitutes the power supply circuit, and controls the gate voltage of the replica transistor so that the output voltage of the replica transistor is constant regardless of the threshold. Therefore, the pixel source voltage supplied from the source supply circuit to pixels can be set to be a predetermined voltage without the influence of variation of threshold voltage of the driver transistor.

Further, according to the present invention, a plurality of driver transistors that constitute the power supply circuit are positioned along one edge of the pixel array, so that it is possible to reduce the decrease of the pixel source voltage supplied to the pixel due to the wiring resistance in the pixel area depending on the location of the pixel column in the pixel array.

Further, according to the present invention, a single depletion NMOS transistor is provided as a driver transistor that constitutes the power supply circuit, so that the area occupied by a transistor can be small in the power supply circuit and the layout for positioning circuit elements can have enough room in reserve.

Further, according to the present invention, a negative voltage generating circuit for generating a negative voltage based on the reference signal is provided, and a negative voltage generated at the negative voltage generating circuit is applied to a pixel section P-well area including an anode area of the photodiode, so that the decrease of the pixel source voltage from the external source voltage at the power supply circuit can be compensated.

As described above, according to the present invention, the power supply circuit for stepping down the external source voltage to generate the pixel source voltage to be supplied to each pixel in the pixel array is provided, and the power supply circuit is configured to include a driver transistor for generating the pixel source voltage from the external source voltage, the driver transistor being operative in a saturated state. As a result, even when noise is superimposed on the external source voltage, the influence of the noise to the output side of the driver transistor can be prevented, which results in obtaining an effect to supply a stable voltage level to the pixels and further the vertical driving circuit without using a boosting circuit that causes an increase in the layout area and the current consumption.

These and other advantages of the present invention will become apparent to those skilled in the art upon reading and understanding the following detailed description with reference to the accompanying figures.

100, 100a, 100b solid-state image capturing apparatus
110 pixel array (PIX AREA)
120 vertical scanning circuit (DECV)
130 horizontal scanning circuit (DECH)
140 pixel current load section (PIXLOAD)
150, 170 pixel power source regulator
150a, 170a pixel power source driver
150b bias level generating circuit
151 differential amplifier
152a, 152b first resistance, second resistance
Atr amplifying transistor
FD electric charge accumulating section (floating diffusion)
DL replica transistor
L, Lt driver transistor
PD photoelectric conversion element (photodiode)
Px, Py pixel
Rtr reset transistor
Str selection transistor
Ttr transfer transistor

DESCRIPTION OF THE PREFERRED EMBODIMENTS

Hereinafter, embodiments of the present invention will be described with reference to the accompanying figures.

Embodiment 1

Figure 1:
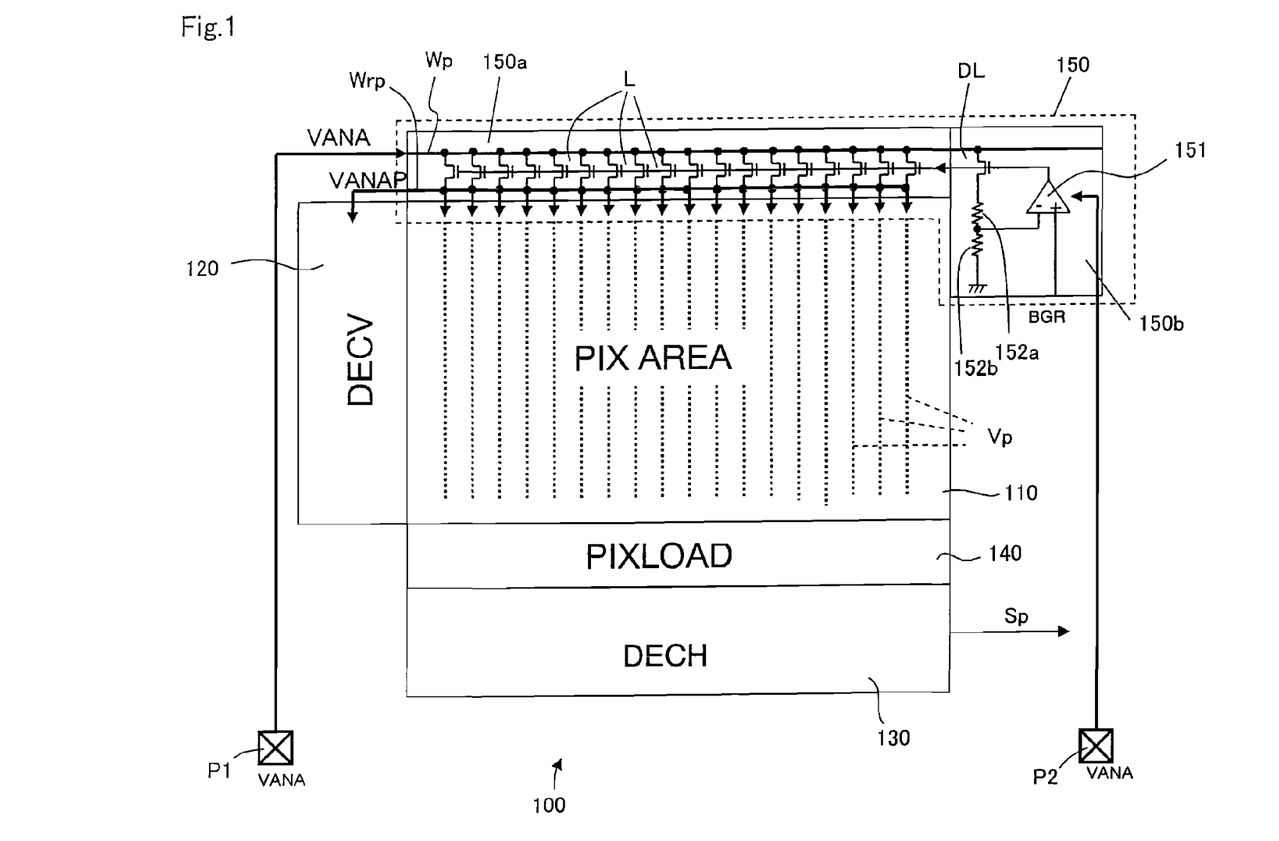
FIG. 1 is a block diagram illustrating a solid-state image capturing apparatus according to Embodiment 1 of the present invention, showing a configuration for supplying an external source voltage to pixels and a vertical driving circuit.

FIG. 1 is a block diagram illustrating a solid-state image capturing apparatus according to Embodiment 1 of the present invention, showing a configuration for supplying an external source voltage to pixels and a vertical driving circuit.

A solid-state image capturing apparatus 100 according to Embodiment 1 is the conventional solid-state image capturing apparatus 200 shown in FIG. 6 equipped with a pixel power source regulator 150 for stepping down a source voltage VANA from an external power source to generate a constant level of pixel source voltage (analog voltage) VANAP.

That is, the solid-state image capturing apparatus 100 includes a pixel array (PIX AREA) 110 where pixels are arranged in a matrix; a vertical signal line (output signal line Vp provided to correspond to each pixel column of the pixel array for reading out a voltage signal from each pixel of a corresponding pixel column; a vertical scanning circuit (DECV) 120 for selecting a specific pixel row in the pixel array to drive the pixels of selected pixel row; a horizontal scanning circuit (DECH) 130 for processing a voltage signal read out from each pixel of the selected pixel row to the corresponding vertical signal line Vp to be output as a pixel signal Sp; and a pixel current load section (PIXLOAD) 140 connected to the vertical signal line Vp so as to flow a constant current to each vertical signal line Vp. Herein, pad P1 and pad P2 are power source pads to which the external source voltage VANA is applied.

In addition, the solid-state image capturing apparatus 100 according to Embodiment 1 is configured such that the analog voltage VANAP is supplied from the pixel power source regulator 150 to each pixel in the pixel array 110 and the vertical scanning circuit 120.

Herein, the pixel power source regulator 150 includes a pixel power source driver 150a that receives the external source voltage VANA applied to the power source pad P1 to drive the pixels in each pixel column; and a bias level generating circuit 150b for controlling the pixel power source driver 150a so that the voltage that the pixel power source driver 150a supplies to the pixels will be constant.

In addition, the pixel power source driver 150a includes an external power source line Wp positioned along one edge of the horizontal side of the pixel array 110; a pixel power source line Wrp positioned in parallel with the external power source line Wp to be positioned between the external power source line Wp and the pixel array 110; and a plurality of driver transistors L positioned between the power source lines and along one end of each pixel array. The gates of the driver transistors are commonly connected so that voltage step-down due to the wiring resistance of the pixel power source line Wrp will not occur.

Herein, in the pixel current load section 140, the current load is configured such that a constant current flows into the driver transistors L, and the source voltage VANAP is determined by the constant current and a gate electric potential of the driver transistor L. The source voltage VANAP is set such that a between-drain sources voltage $V_{DS}$ of the driver transistor L fulfills the following equation (1); that is, the driver transistor will operate in its saturated state.

$$V_{DS} = V_{GS} - Vth \qquad (1)$$

Herein, $V_{GS}$ is a between-gate sources voltage and Vth is a threshold voltage of the transistor.

Further, the bias level generating circuit 150b includes a replica transistor DL in which a drain is connected to the external power source line Wp and a gate is commonly-connected with the plurality of driver transistors L; first and second resistors 152a and 152b connected in series between a source of the replica transistor DL and the ground; and a differential amplifier 151 in which the negative side input is connected to connecting points of the two resistors and a reference voltage (BGR) is the input of the positive side input. The output of the differential amplifier 151 is commonly connected to a gate of the replica transistor DL and gates of the plurality of driver transistors L that constitute the pixel power source driver 150a. In addition, the differential amplifier 151 is supplied with the source voltage VANA from the external power source through the second power source pad P2.

Figure 2:
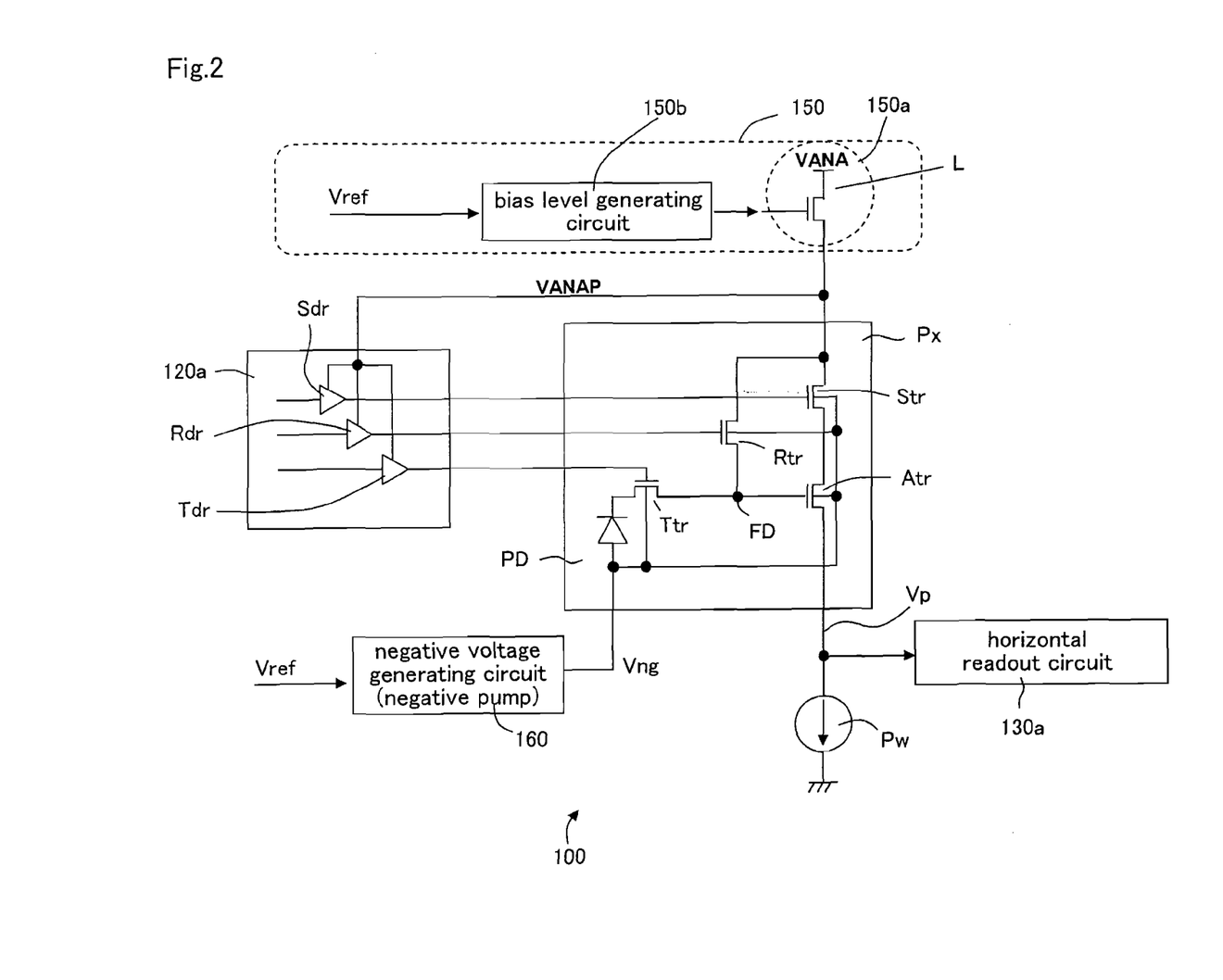
FIG. 2 is a diagram illustrating a circuit configuration of one pixel in a pixel array of the solid-state image capturing apparatus 100 according to Embodiment 1 and a vertical driving circuit connected to one pixel in a vertical scanning circuit.

FIG. 2 is a diagram illustrating a circuit configuration of one pixel in a pixel array of the solid-state image capturing apparatus 100 and a vertical driving circuit connected to one pixel in a vertical scanning circuit.

Herein, similar to the one in the conventional solid-state image capturing apparatus 200, the pixel Px includes: a photo electric conversion element (photodiode) PD; an electric charge accumulating section (floating diffusion) FD for accumulating a signal charge generated at the photodiode PD; a transfer transistor Ttr for transferring the signal charge generated at the photodiode to the electric charge accumulating section FD; a reset transistor Rtr for resetting the signal charge accumulated in the electric charge accumulating section FD; an amplifying transistor Atr for amplifying an electric potential of the electric charge accumulating section FD to be output to the vertical signal line Vp; and a selection transistor Str connected between a drain of the amplifying transistor Atr and the pixel source voltage VANAP for controlling the supply of the pixel source voltage to the amplifying transistor Atr. In addition, the pixel Px is connected to a vertical driving circuit 120a for driving the pixel, and the vertical driving circuit 120a includes a driver Sdr for driving the selection transistor Str; a driver Rdr for driving the reset transistor Rtr described above; and a driver Tdr for driving the transfer transistor Ttr described above, as similar to the conventional vertical driving circuit.

In addition, a constant current source Pw is connected between the vertical signal line Vp and the ground, and a horizontal readout circuit 130a for reading out a voltage signal read out to the vertical signal line Vp is connected to the vertical signal line Vp corresponding to each pixel column. The horizontal readout circuit 130a is a circuit portion corresponding to one pixel column in the horizontal scanning circuit 130, and has the same configuration as the horizontal readout circuit 230a in the conventional solid-state image capturing apparatus.

Further, the solid-state image capturing apparatus 100 according to Embodiment 1 includes a negative voltage generating circuit 160 for generating a negative voltage based on the reference voltage. This negative voltage Vng is applied to a semiconductor substrate that constitutes the solid-state image capturing apparatus, and is a bias on the anode side of the photodiode as well as a back gate bias of each of the transistors described above. As a result, the pixel source voltage VANAP becomes a voltage lower than the external source voltage VANA at the voltage step-down type power source regulator 150 so as to compensate for the shortage of a gate voltage of each transistor that constitutes the pixel.

Figure 3:
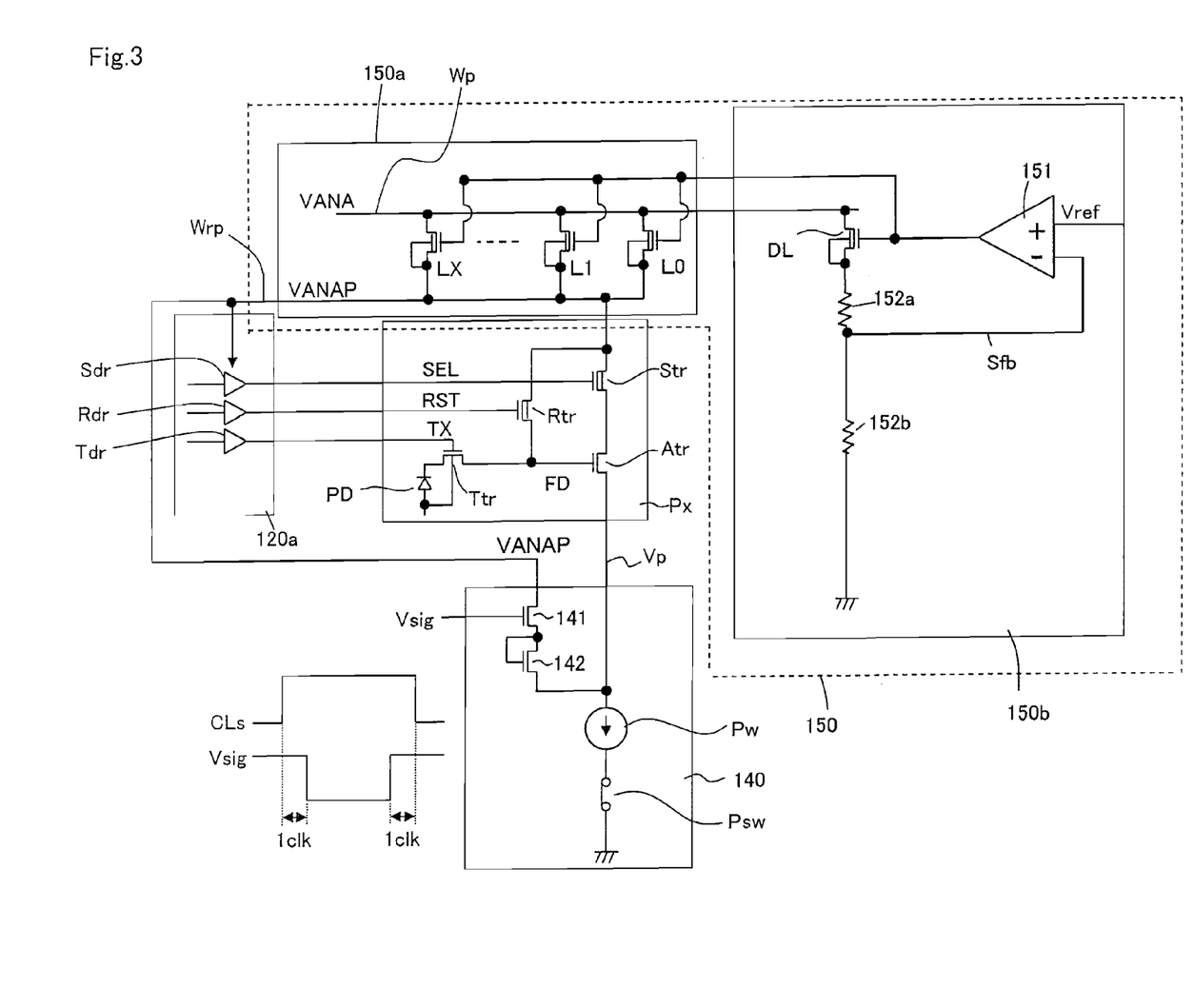
FIG. 3 is a diagram illustrating a specific circuit configuration of the pixel power source regulator 150 and the pixel current load section 140 according to Embodiment 1.

FIG. 3 is a diagram illustrating a specific circuit configuration of the pixel power source regulator 150 and the pixel current load section 140.

As described above, the pixel power source driver 150a includes a plurality of driver transistors positioned in parallel between the external power source line Wp and the pixel power source line Wrp described above. Herein, depletion NMOS transistors L0, L1 . . . LX are used for these driver transistors.

Further, a depletion NMOS transistor that has the same form (the same characteristics) as the driver transistor described above is used for the replica transistor DL that constitutes the bias level generating circuit 150b, and the first and second resistors 152a and 152b connected in series between the source of the replica transistor DL and the ground constitute a resistor tap circuit. In the resistor tap circuit, the resistance value of these resistors are adjusted such that the VANAP voltage becomes an appropriate value. In other words, the bias level generating circuit 150b includes a replica transistor DL that has the same characteristic as the driver transistor L that constitutes the pixel power source driver 150a, and controls the gate voltage of the replica transistor DL by the first and second resistors 152a and 152b so that the output voltage of the replica transistor is constant regardless of the threshold thereof.

In addition, the pixel current load section 140 includes: a first NMOS transistor 141 in which the drain is connected to the pixel power source line Wrp described above; a second NMOS transistor 142 connected between a source of the first NMOS transistor 141 and the vertical signal line Vp described above; a constant current source Pw connected to a connection point between the second NMOS transistor 142 and the vertical signal line Vp; and a switch Psw connected between the constant current source and the ground. The gate of the second NMOS transistor 142 is connected to the source of the first NMOS transistor 141 and a timing signal (VSIG_INT signal) Vsig synchronized with a selection signal (SELCLK signal) CLs, which is applied to the gate of the selection transistor Str, is applied to the gate of the first NMOS transistor 141. Herein, the timing signal (VSIG_INT signal) Vsig falls one clock after the rising edge of a selection signal (SELCLK signal) CLs and rises one clock prior to the falling edge of the selection signal (SELCLK signal) CLs. Such a timing signal is applied to the gate of the first NMOS transistor 141, so that the increase of the voltage of the pixel power source VANAP is avoided in a state where the selection transistor is turned off.

In Embodiment 1, a depletion NMOS transistor is used for the selection transistor Str and the reset transistor Rtr that constitute the pixel Px.

Next, the operation will be described.

According to the solid-state image capturing apparatus 100 of Embodiment 1, the pixel source voltage VANAP is generated based on the reference voltage (BGR) Vref at the pixel power source regulator 150, and the pixel source voltage VANAP is supplied to the pixel Px and the vertical scanning circuit 120a.

In each pixel Px of the pixel array 110, a signal charge is generated by the photodiode PD, a signal level corresponding to the signal charge and a reset level are read out to the vertical signal line Vp by the vertical scanning circuit 120, and further, the signal voltage and reset voltage read out to the vertical signal line Vp are processed by the horizontal scanning circuit 130 and are output as a pixel signal Sp of each pixel. Herein, the operation that the signal voltage and reset voltage is read out from each pixel Px to the vertical signal line Vp is the same as that of the conventional solid-state image capturing apparatus. Therefore, the operation of the pixel power source regulator 150 for creating an analog voltage (pixel source voltage) VANAP supplied to the pixel and the vertical driving circuit 120a in the DECV based on the external source voltage VANA, will be described.

In the bias level generating circuit 150b, a desired reference voltage level (PIX_SFGATE) is created based on the reference electric potential (BGR electric potential) Vref obtained by utilizing the band gap of the semiconductor elements (such as transistors). This created reference voltage level (PIX_SFGATE) is supplied to the gate of the pixel power source driver transistor (VANAP regulator) L. The source level of the pixel power source driver transistor (VANAP regulator) L performs a so-called source follower operation that depends on a gate level.

Therefore, the relationship is as follows between the pixel source voltage (VANAP) supplied to the pixel Px and the vertical driving circuit 120a shown in FIG. 2, and the reference voltage level (PIX_SFGATE) described above.

$$VANAP = PIX\_SFGATE - Vth - (2I/\beta)^{0.5}$$

However, Vth is a threshold voltage level of the pixel power source driver transistor L, I is a current flowing to the pixel power source driver transistor L, and β is a gain coefficient of the pixel power source driver transistor. The reference voltage level (PIX_SFGATE) created by the bias level generating circuit 150b is a stable level that does not depend on the external source voltage, and the source level (VANAP), which is the output of the pixel power source driver transistor L, becomes a stable level that is not influenced by the noise from the external power source when a constant current is flowing into the pixel power source driver transistor L.

In addition, the increase of the supply capability of current to the pixel or the vertical driving circuit can be easily achieved by increasing the current supply capability (i.e., transistor width) of the pixel power source driver transistor L.

In addition, as described above, the pixel source voltage VANAP to be supplied to the pixel and the vertical driving circuit decreases by using the pixel power source regulator 150. In order to compensate for this, a negative voltage Vng is created at the negative voltage generating circuit 160 based on the reference electric potential (BGR electric potential) Vref that uses a band gap and the negative voltage Vng is supplied to the P-well area above the semiconductor substrate, which constitutes the pixel array 110.

Consequently, when a pixel data (i.e., signal charge generated at the photodiode) is read out, all the electrons (signal charges) in the photodiode PD can be transferred to the electric charge accumulating section FD even if the pixel source voltage VANAP is low.

In other words, if not all the electrons in the photodiode can be transferred to the electric charge accumulating section FD, a poor functioning such as after-image occurs. However, according to Embodiment 1, the negative voltage created by the negative voltage generating circuit 160 is applied to the photodiode anode area (P-well area), so that it is possible to lower a depletion voltage and transfer all the electrons in the photodiode to the electric charge accumulating section FD.

A more specific operation of the pixel power source regulator 150 will be described with reference to FIG. 3.

In the bias level generating circuit 150b in the pixel power source regulator 150, a stable reference voltage level (PIX_SFGATE) is created by a differential amplifying circuit 151, the reference voltage level being about a little less than twice (about 2.0V) of the BGR electric potential (1.25V) Vref as a reference electric potential.

Herein, depletion NMOS transistors are used for the pixel power source driver transistor L0, L1 ... LX, and back gates of these transistors are separated from other P-wells other than the P-wells that constitute the transistors and are connected to the sources of the transistors, so that the voltage operation range (voltage range operative in a saturated area) of the pixel power source driver transistor can be widened by suppressing the change of the threshold voltage of the driver transistor.

Further, when noise is superimposed to the externally supplied source voltage (VANA), the influence of the noise to the VANAP can be eliminated by operating the pixel power source driver transistor L0, L1 ... LX in a saturated state. As a result, the voltage level VANAP, which is created by the pixel power source regulator 150 and supplied to the pixel Px and the vertical driving circuit 120a, becomes a stable level that is not influenced by the change of the source voltage.

According to Embodiment 1 as described above, the pixel source voltage created at the pixel power source regulator is input into the pixel Px and the vertical driving circuit 120a and the negative voltage created by the negative voltage generating circuit 160 is input into the P-well that includes the anode area of the photodiode in the pixel, so that the influence of the noise superimposed on the power source and the change of the power source level can be avoided compared to the conventional case where the power is directly supplied to the pixels from the outside.

That is, when a constant current flows in the pixel power source driver transistor by a constant current source of the pixel current load section (PIXLOAD), the source voltage VANAP of a pixel section and the vertical driving circuit is determined by this current and the gate electric potential. Accordingly, the power source VANAP generated thus is not influenced by the externally provided power source VANA as long as the pixel power source driver transistor is operating in a saturated state, thereby eliminating the influence of the power source noise from the external systems.

In addition, compared to the conventional case where the source voltage is boosted by the boosting circuit (charge pump) and a high voltage is input into pixels, it is possible to downsize the layout area and reduce the current consumption.

Further, by connecting the source and drain of the NMOS transistor to the pixel source voltage VANAP and the external source voltage VANA respectively and inputting into the gate a constant bias level that does not depend on the source voltage, the pixel source voltage VANAP can be maintained at a constant voltage. Further, the bias level generating circuit includes a replica transistor that has the same characteristic as the driver transistor that constitutes the power supply circuit, and controls the gate voltage of the replica transistor so that the output voltage of the replica transistor is constant regardless of the threshold. Therefore, the pixel source voltage supplied from the source supply circuit to pixels can be set to be a predetermined voltage without the influence of variation of threshold voltage of the driver transistor.

In addition, by distributing and arranging the pixel power source driver transistors L described above on one edge of the pixel area for positioning, it is possible to reduce the influence of voltage step-down due to the wiring resistance in the pixel area.

Further, when the source voltage VANAP generated at the voltage step-down type pixel power source regulator is lower than the depletion voltage of the pixel as described above, not all the electrons accumulated in the photodiode can be transferred to the electric charge accumulating section FD, a poor functioning such as after-image occurs. However, according to Embodiment 1, this can be avoided. That is, the negative voltage generating circuit 160 is provided in the chip and the negative voltage is applied to the P-well area of the pixel so as to compensate for the decrease of the source voltage of the pixel and the vertical driving circuit. Herein, it is sufficient for the current capability of the negative voltage generating circuit to compensate for the leak from the P-well, and a large current capability is not necessary. As a result, the layout area is reduced and operation with little current consumption is possible, compared to the case where a boosting circuit is used in the pixel power source section.

Embodiment 2

Figure 4:
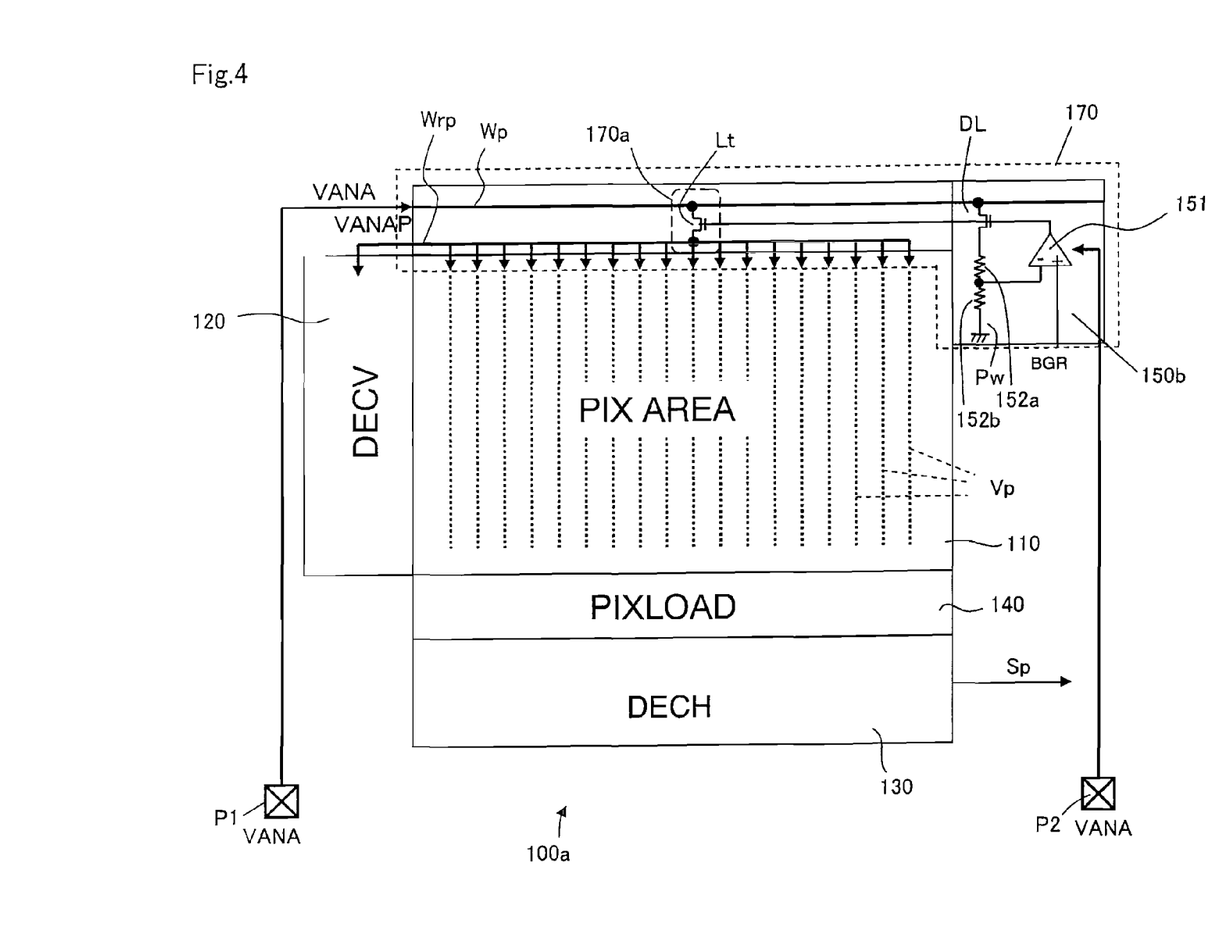
FIG. 4 is a block diagram illustrating a solid-state image capturing apparatus according to Embodiment 2 of the present invention, showing a configuration for supplying an external source voltage to a pixel and a vertical driving circuit.

FIG. 4 is a block diagram illustrating a solid-state image capturing apparatus according to Embodiment 2 of the present invention, showing a configuration for supplying an external source voltage to a pixel and a vertical driving circuit.

A solid-state image capturing apparatus 100a according to Embodiment 2 is configured with a pixel power source regulator 170 that includes a pixel power source driver 170a consisting of a single driver transistor, instead of the pixel power source regulator 150 of the solid-state image capturing apparatus 100 according to Embodiment 1.

In the solid-state image capturing apparatus 100a according to Embodiment 2 with the configuration described above, the current supply capability of the pixel power source driver transistor Lt, which creates a pixel voltage VANAP based on the reference voltage (PIX_SFGATE) generated in the pixel source regulator 170, is increased (the transistor width is increased) so as to supply the pixel source voltage VANAP to all the pixels by one pixel power source driver transistor Lt.

As a result, there will be a difference in the level of the pixel source voltage VANAP between a pixel column near the pixel power source driver transistor Lt and a pixel column far from the pixel power source driver transistor Lt, and the source voltage which is applied to the pixels far from the pixel power source driver transistor is decreased, and the operation margin is reduced. On the other hand, since a single depletion NMOS transistor is used as a driver transistor that constitutes the pixel power source regulator, so that the area occupied by a transistor can be small in the pixel power source regulator and the layout for positioning circuit elements can have enough room in reserve.

Embodiment 3

Figure 5:
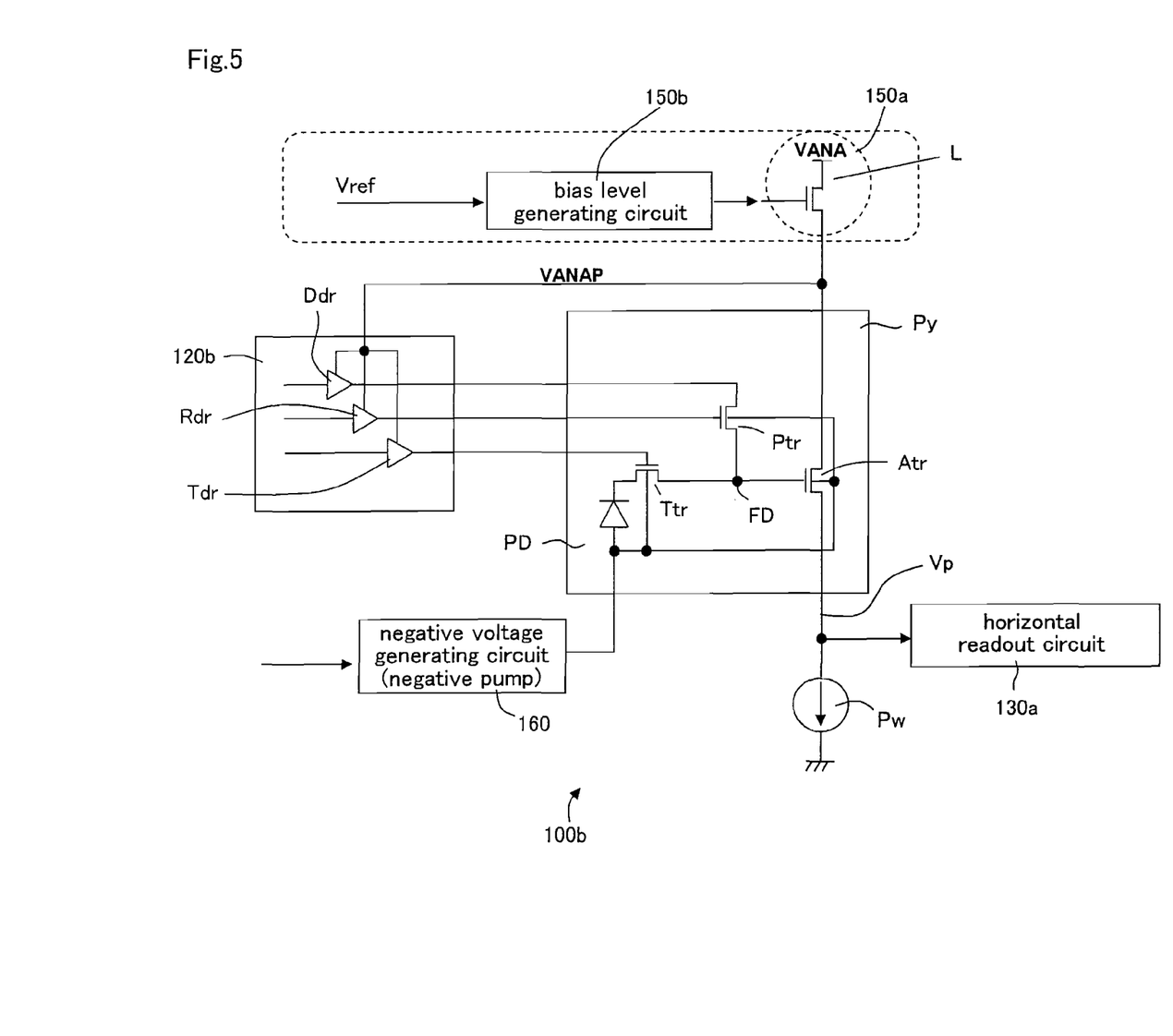
FIG. 5 is a block diagram illustrating a solid-state image capturing apparatus according to Embodiment 3 of the present invention, showing a circuit configuration of one pixel in a pixel array and a vertical driving circuit connected to one pixel in a vertical scanning circuit.

FIG. 5 is a block diagram illustrating a solid-state image capturing apparatus according to Embodiment 3 of the present invention, showing a configuration for supplying an external source voltage to a pixel and a vertical driving circuit.

A solid-state image capturing apparatus 100b according to Embodiment 3 is configured with a pixel Py with a 3Tr configuration instead of the pixel Px with a 4Tr configuration that constitutes the pixel array of the solid-state image capturing apparatus 100 according to Embodiment 1 described above.

That is, the pixel Py that constitutes the pixel array includes: a photoelectric conversion element (photodiode) PD; an electric charge accumulating section (floating diffusion) FD for accumulating the signal charge generated at the photodiode PD; a transfer transistor Ttr for transferring the signal charge generated at the photodiode to the electric charge accumulating section FD; a reset transistor Rtr for resetting the signal charge accumulated in the electric charge accumulating section FD; and an amplifying transistor Atr for amplifying an electric potential of the electric charge accumulating section FD to be output to the vertical signal line Vp. In addition, a vertical driving circuit 120b is connected to the pixel Py to drive the pixel, and vertical driving circuit 120b includes a driver Rdr for driving the reset transistor Rtr; a driver Tdr for driving the transfer transistor Ttr described above; and a drain side driver Ddr for switching a drain of the reset transistor Rtr between the high level and the low level to select a pixel. In addition, other configurations of Embodiment 3 are the same as that of Embodiment 1.

In the solid-state image capturing apparatus 100b according to Embodiment 3 with the configuration described above, an effect of reducing the area occupied by the transistors that constitute the pixel can be obtained, in addition to the effect of Embodiment 1.

Embodiment 4

Although not specifically described in Embodiments 1 to 3 described above, an electronic information equipment having an image input device will be described hereinafter as Embodiment 4 of the present invention. The electronic information equipment having an image input device, such as a digital camera (e.g., digital video camera and digital still camera), an image input camera, a scanner, a facsimile machine and a camera-equipped cell phone device, includes an image capturing section using at least one of the solid-state image capturing apparatuses according to Embodiments 1 to 3 described above.

Figure 9:
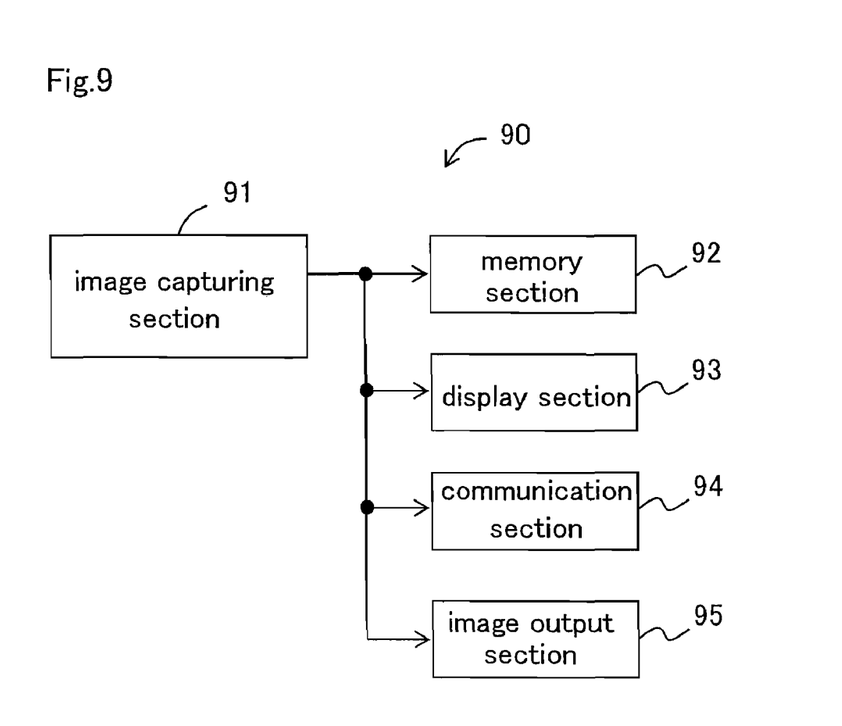
FIG. 9 is a block diagram illustrating an exemplary diagrammatic structure of an electronic information equipment, as Embodiment 4 of the present invention, using the solid-state image capturing apparatus according to any of Embodiments 1 to 3 of the present invention in an image capturing section.

FIG. 9 is a block diagram illustrating an exemplary diagrammatic structure of an electronic information equipment, as Embodiment 4 of the present invention, using the solid-state image capturing apparatus according to any of Embodiments 1 to 3 of the present invention as an image input device in an image capturing section.

The electronic information equipment 90 according to Embodiment 4 of the present invention as illustrated in FIG. 9 includes any of the solid-state image capturing apparatuses according to Embodiment 1 to 3 of the present invention as an image capturing section 91 for capturing a subject. The electronic information equipment 90 further includes at least any of: a memory section 92 (e.g., recording media) for data-recording a high-quality image data obtained by using at least any of the solid-state image capturing apparatuses according to Embodiments 1 to 3 in an image capturing section, after a predetermined signal process is performed on the image data for recording; a display section 93 (e.g., liquid crystal display device) for displaying this image data on a display screen (e.g., liquid crystal display screen) after a predetermined signal process is performed on the image data for display; a communication section 94 (e.g., transmitting and receiving device) for communicating this image data after a predetermined signal process is performed on the image data for communication; and an image output section 95 for printing (typing out) and outputting (printing out) this image data.

As described above, the present invention is exemplified by the use of its preferred Embodiments 1 to 4. However, the present invention should not be interpreted solely based on Embodiments 1 to 4 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 to 4 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a solid-state image capturing apparatus equipped with a pixel power regulator and an electronic information equipment using such a solid-state image capturing apparatus. According to the present invention, it is possible to obtain a solid-state image capturing apparatus that is able to supply a stable voltage level to the pixels and further to the vertical driving circuit without using a boosting circuit that causes the increase of the layout area and the current consumption, and an electronic information equipment using such a solid-state image capturing apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state image capturing apparatus, comprising:
a pixel array in which a plurality of pixels are arranged;
a driving circuit for driving each pixel of the pixel array; and
a power supply circuit for stepping down an external source voltage supplied from an external power source to generate a pixel source voltage to be supplied to each pixel of the pixel array,
wherein the power supply circuit includes a driver transistor for generating a pixel source voltage from the external source voltage and the driver transistor is operative in a saturated state.

2. A solid-state image capturing apparatus according to claim 1, wherein the driver transistor that constitutes the power supply circuit is an NMOS transistor and a back gate of the driver transistor is commonly connected to a source.

3. A solid-state image capturing apparatus according to claim 1, wherein the power supply circuit includes a single transistor as the driver transistor.

4. A solid-state image capturing apparatus according to claim 1, wherein the driving circuit includes a vertical scanning circuit that selects a specific pixel row in the pixel array and drives pixels in the selected pixel row, and the power supply circuit supplies the pixel source voltage to the vertical driving circuit.

5. An electronic information equipment comprising an image capturing section for capturing an image of a subject, wherein the image capturing section is the solid-state image capturing apparatus according to claim 1.

6. A solid-state image capturing apparatus according to claim 1, wherein the power supply circuit includes a plurality of driver transistors positioned along one edge of the pixel array, as the driver transistor.

7. A solid-state image capturing apparatus according to claim 6, wherein the plurality of driver transistors are depletion NMOS transistors.

8. A solid-state image capturing apparatus according to claim 7, wherein the single driver transistor is a depletion NMOS transistor.

9. A solid-state image capturing apparatus according to claim 1, further including a bias level generating circuit for creating a constant bias level that does not depend on the external source voltage based on a reference signal, wherein the bias level is used as a control voltage of a driver transistor that constitutes the power supply circuit.

10. A solid-state image capturing apparatus according to claim 9, wherein the bias level generating circuit controls a gate voltage of the driver transistor such that the pixel source voltage supplied from the power supply circuit becomes constant regardless of a threshold value of the driver transistor.

11. A solid-state image capturing apparatus according to claim 9,
wherein the bias level generating circuit includes a replica transistor that has a same characteristic as the driver transistor that constitutes the power supply circuit, a resistor tap circuit inserted between a source of the replica transistor and a ground, and a differential amplifying circuit that takes as an input a reference voltage and a resistor tap voltage obtained at the resistor tap circuit, and
wherein an output of the differential amplifying circuit is connected to a gate of the driver transistor that configures the power supply circuit and a gate of the replica transistor.

12. A solid-state image capturing apparatus according to claim 1, further including an output signal line provided for each pixel column in the pixel array for outputting a signal level obtained in pixels of the pixel column,
wherein the pixel includes:
a photoelectric conversion section for generating a signal charge in accordance with a light receiving amount by a photoelectric conversion of an incident light;
an electric charge accumulating section for accumulating the signal charge;
a transfer transistor for transferring the signal charge from the photoelectric conversion section to the electric charge accumulating section;
a reset transistor for resetting the signal charge accumulated in the electric charge accumulating section;
an amplifying transistor supplied with the pixel source voltage for amplifying a signal level of the electric charge accumulating section to be output; and
a selection transistor connected between the amplifying transistor and the output signal line and controlled by the selection signal line to output the signal level amplified by the amplifying transistor to the output signal line.

13. A solid-state image capturing apparatus according to claim 12, further including a negative voltage generating circuit for generating a negative voltage based on a reference signal, wherein each transistor and a photodiode that constitute the pixel are formed in a P-well area formed on a semiconductor substrate, and the negative voltage generating circuit supplies the negative voltage to the P-well area, including an anode area of the photodiode, so that stepped down voltage, which is generated in the power supply circuit, that is a difference from an external source voltage of the pixel source voltage, is compensated.

14. A solid-state image capturing apparatus according to claim 12, wherein the selection transistor and the reset transistor are depletion NMOS transistors.

15. A solid-state image capturing apparatus according to claim 1, further including an output signal line provided for each pixel column in the pixel array for outputting a signal level obtained in pixels of the pixel column,
wherein the pixel includes:
a photoelectric conversion section for generating a signal charge in accordance with a light receiving amount by a photoelectric conversion of an incident light;
an electric charge accumulating section for accumulating the signal charge;
a transfer transistor for transferring the signal charge from the photoelectric conversion section to the electric charge accumulating section;
a reset transistor for resetting the signal charge accumulated in the electric charge accumulating section; and
an amplifying transistor to which the pixel source voltage is supplied for amplifying a signal level of the electric charge accumulating section to be output to the vertical signal line.

16. A solid-state image capturing apparatus according to claim 15, further including a negative voltage generating circuit for generating a negative voltage based on a reference signal, wherein each transistor and a photodiode that constitute the pixel are formed in a P-well area formed on a semiconductor substrate, and the negative voltage generating circuit supplies the negative voltage to the P-well area, including an anode area of the photodiode, so that stepped down voltage, which is generated in the power supply circuit, that is a difference from an external source voltage of the pixel source voltage, is compensated.

17. A solid-state image capturing apparatus according to claim 15, wherein the reset transistor is a depletion NMOS transistor.

* * * * *